(12) United States Patent
Stumpf et al.

(10) Patent No.: US 10,244,394 B2
(45) Date of Patent: Mar. 26, 2019

(54) METHOD AND UPDATE GATEWAY FOR UPDATING AN EMBEDDED CONTROL UNIT

(71) Applicant: Robert Bosch GmbH, Stuttgart (DE)

(72) Inventors: Frederic Stumpf, Leonberg (DE); Jan Holle, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 444 days.

(21) Appl. No.: 15/155,537

(22) Filed: May 16, 2016

(65) Prior Publication Data
US 2016/0344705 A1 Nov. 24, 2016

(30) Foreign Application Priority Data

May 19, 2015 (DE) .................. 10 2015 209 116

(51) Int. Cl.
| | |
|---|---|
| *H04W 12/06* | (2009.01) |
| *H04L 29/08* | (2006.01) |
| *H04L 9/32* | (2006.01) |
| *H04L 9/14* | (2006.01) |
| *H04L 9/30* | (2006.01) |

(Continued)

(52) U.S. Cl.
CPC ............ *H04W 12/06* (2013.01); *G06F 21/57* (2013.01); *H04L 9/14* (2013.01); *H04L 9/30* (2013.01); *H04L 9/3263* (2013.01); *H04L 67/12* (2013.01); *H04W 4/046* (2013.01); *H04W 12/04* (2013.01); *H04L 63/0807* (2013.01); *H04L 63/0823* (2013.01); *H04L 63/12* (2013.01); *H04L 2209/80* (2013.01); *H04L 2209/84* (2013.01); *H04W 12/10* (2013.01)

(58) Field of Classification Search
CPC .......... H04W 4/44; H04W 4/48; H04W 4/50; H04W 12/06; H04L 9/30; H04L 9/3263; H04L 67/12; G06F 8/65; G06F 21/57
See application file for complete search history.

(56) References Cited

U.S. PATENT DOCUMENTS

| | | | |
|---|---|---|---|
| 8,856,536 B2 | 10/2014 | Rabadi et al. | |
| 2006/0130033 A1* | 6/2006 | Stoffels ..................... | G06F 8/61 717/166 |

(Continued)

*Primary Examiner* — Hadi S Armouche
*Assistant Examiner* — Paul E Callahan
(74) *Attorney, Agent, or Firm* — Norton Rose Fulbright US LLP; Gerard Messina

(57) ABSTRACT

A method for updating an embedded electronic control unit, including an update gateway requests from a hardware security module an update request destined for the electronic control unit, the update gateway receives from the hardware security module the update request, which is signed by the hardware security module, the update gateway creates a communication channel, based on a cryptographic identity of the update gateway, to a backend, the update gateway sends the update request to the backend, the update gateway receives from the backend via the communication channel an update ticket which corresponds to the update request and is signed by the backend, in addition to associated update data, validates the update data, initiates a validation of the update ticket, checks the result of the validation, and depending on the result, the update gateway updates the electronic control unit with the update data.

6 Claims, 5 Drawing Sheets

(51) Int. Cl.
*H04W 12/04* (2009.01)
*H04W 4/04* (2009.01)
*G06F 21/57* (2013.01)
*H04L 29/06* (2006.01)
*H04W 12/10* (2009.01)

(56) References Cited

U.S. PATENT DOCUMENTS

| | | | |
|---|---|---|---|
| 2015/0057838 A1* | 2/2015 | Scholl | H04W 4/046 |
| | | | 701/2 |
| 2015/0232065 A1* | 8/2015 | Ricci | B60R 25/01 |
| | | | 701/36 |
| 2015/0242198 A1* | 8/2015 | Tobolski | G06F 8/61 |
| | | | 717/172 |
| 2017/0244565 A1* | 8/2017 | Bronk | H04L 63/126 |

* cited by examiner

METHOD AND UPDATE GATEWAY FOR UPDATING AN EMBEDDED CONTROL UNIT

CROSS REFERENCE

The present application claims the benefit under 35 U.S.C. § 119 of German Patent Application No. DE 102015209116.3 filed on May 19, 2015, which is expressly incorporated herein by reference in its entirety.

FIELD

The present invention relates to a method for updating an embedded electronic control unit (ECU). Moreover, the present invention relates to a corresponding update gateway, a corresponding computer program, and a corresponding memory medium.

BACKGROUND INFORMATION

A diagnostic communication protocol used in automotive electronics for unified diagnostic services (UDS) is specified according to the ISO 14229 international standard. These types of diagnostic services allow contacting and maintenance of various control units in a vehicle, with involvement of the session layer and application layer of a field bus system. A vehicle equipped in this way generally includes a diagnostic interface for the so-called on-board diagnosis, which allows a client, referred to as a diagnostic tester, to be connected to the field bus system. It is thus possible, for example, to query the error memory of individual control units or update them with new firmware.

U.S. Pat. No. 8,856,536 B2 describes a method for authenticating a piece of firmware which is to be downloaded to a controller. The method includes signing the firmware or a first part of the firmware with a first private key at a first trusted source and signing the firmware or a second part of the firmware with a second private key at a second trusted source. The method also includes validating the signed firmware or the first part of the firmware using a first public key at the controller and validating the firmware or the second part of the firmware using a second public key at the controller. The method further includes authenticating the firmware if the firmware or the first part of the firmware is validated by the first public key at the controller, and the firmware or the second part of the firmware is validated by the second public key at the controller.

SUMMARY

The present invention provides a method for updating an embedded electronic control unit, a corresponding update gateway, a corresponding computer program, and a corresponding memory medium according to the independent claims.

This approach allows deeply embedded control units to be securely updated without an active dialogue with the backend of an original equipment manufacturer (OEM). This is achieved by downloading the data to the update gateway while there is an Internet connection, and subsequently updating when no network connection is available, due to the fact that the vehicle is situated in an underground parking garage, for example.

One advantage of this approach is that update requests from the backend of the vehicle to unlock the control unit may be used multiple times in order to unlock a certain electronic control unit and subsequently update it. This is achieved by a ticket-based mechanism which invalidates the ticket after it has been used by a trusted entity such as a hardware security module (HSM). Another important aspect is that the ticket is cryptographically signed and therefore cannot be counterfeited.

Supplementing the overall update method with a hardware security module provides a trust anchor in which crucial functions may be completely and securely carried out. This trust anchor stores the necessary material for unlocking a certain control unit. This has the advantage that no specific hardware, a diagnostic tester, for example, is necessary in order to update a certain electronic control unit. Storing the cryptographic data for unlocking the electronic control unit on a hardware security module provides better protection against extraction than storing the data directly on the update gateway.

In one embodiment, it may be provided that a certain vehicle and its configuration are uniquely characterized by a cryptographic identity which is securely stored within the hardware security module. By use of this unique identity, the update gateway may now be authenticated with respect to the vehicle backend by utilizing security protocols such as transport layer security (TLS).

According to another aspect, it may be provided to apply a secure channel between the hardware security module and the electronic control unit. This allows an electronic control unit to be updated even though the update gateway has been compromised by an attacker. This is equivalent to tunneling of the update gateway. As a result, an attacker is not able to compromise the update gateway in any way or unlock the control unit in order to carry out attacks.

BRIEF DESCRIPTION OF THE DRAWINGS

Exemplary embodiments of the present invention are illustrated in the figures and are explained in greater detail below.

DETAILED DESCRIPTION OF EXAMPLE EMBODIMENTS

Figure 1:
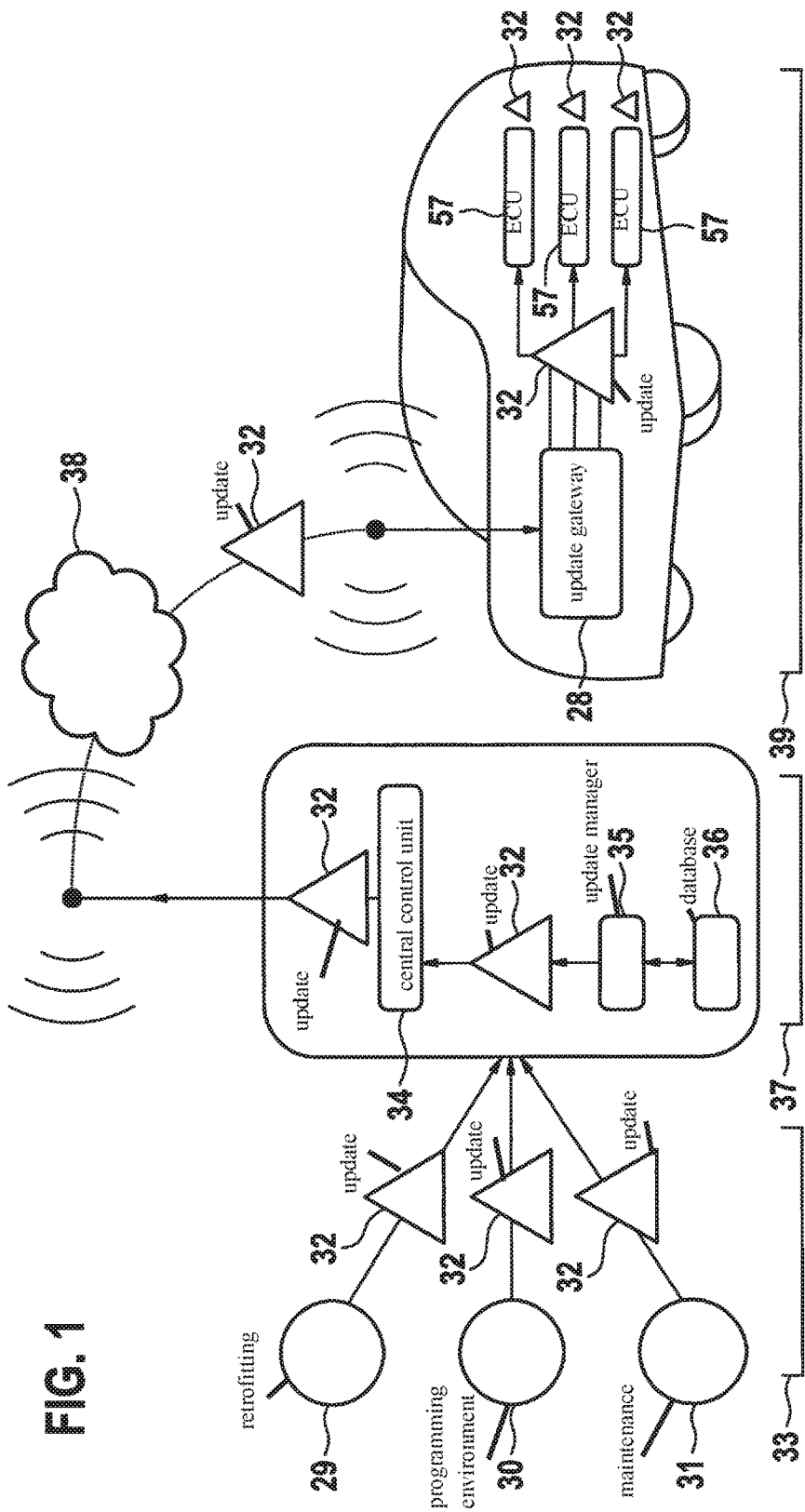
FIG. 1 shows an overview of an update operation.

FIG. 1 illustrates an overall update operation whose components are described below.

Backend 37 is typically controlled by the original equipment manufacturer, and with the aid of an update manager 35 manages a database 36 of software updates for the various control units of an OTA-capable vehicle 21.

Within the scope of update generation 33 for retrofitting 29 or maintenance 31, backend 37 receives updates 32 for certain control units via the highest-priority (tier 1) supplier or other entities that maintain the software of the electronic control units, for example in a programming environment 30.

Whenever new update data for a control unit are available, update gateway 28 is notified by central control unit 34 of backend 37, through backend 37 via a control channel which includes cloud 38, that a new update 32 is available and may be installed.

The downloading of the data to update gateway 28 may take place either without notification of the user, by automatic downloading of the data while a fixed network connection is available, or with participation by the user, so that the download to update gateway 28 is initiated by the user.

After the data have been downloaded to update gateway 28, the update gateway may update the correct electronic control unit 57. This may be triggered either by the user, or without active participation by the user if vehicle 21 is capable of being operated in a completely safe environment without active participation by the user.

Figure 2:
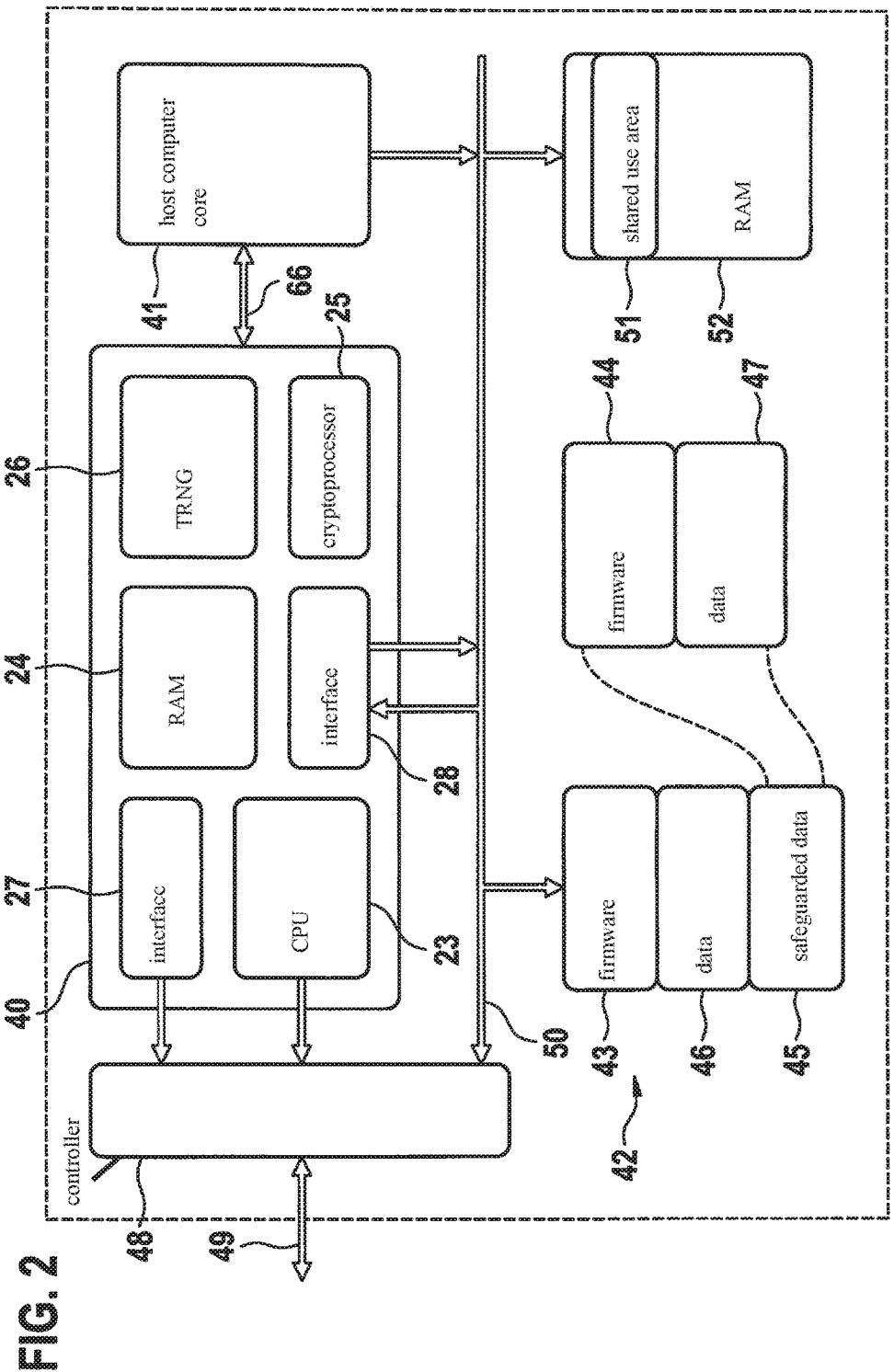
FIG. 2 shows the architecture of a hardware security module.

FIG. 2 shows the basic architecture of a hardware security module 40 used within the scope of one specific embodiment of the present invention. The core of hardware security module 40 is a safeguarded central processing unit (CPU) 23 on which security-critical tasks are executed. Hardware security module 40 also includes a dedicated random access memory (RAM) 24, a bootstrap read-only memory (boot ROM), a cryptoprocessor for advanced encryption standard (AES) 25, and a physical true random number generator (TRNG) 26 as a cryptographic periphery. In addition, the hardware security module may include further cryptographic peripheries such as ECC or RSA accelerators (not shown in the illustration). Also part of hardware security module 40 are interfaces 27 for debugging and an on-chip connection interface 28 (network on a chip, NoC), which are utilized for data communication 50 with processor core 41 of the host computer, which is accessible by interrupt request (IRQ) 66 via shared-use area 51 of system random access memory 52, and for access to flash memory 42 (flash electrically erasable programmable read-only memory (flash EEPROM)). Host computer core 41 is a typical application processor, suitable for vehicles, which provides an execution environment for security-critical tasks, which may be achieved with the aid of additional lockstep cores, for example. Flash memory 42 is divided between host computer core 41 and hardware security module 40. However, implementations are also conceivable in which the HSM and host each have dedicated memory areas. Firmware 43 of hardware security module 40 and firmware 44 of host computer core 41 are stored together with associated data 46 or 47, respectively, in shared-use flash memory 42. A memory protection unit (MPU), not shown in the illustration, ensures that only hardware security module 40 is granted access to the data which are safeguarded 45 in flash memory 42 and allocated to the hardware security module itself. While hardware security module 40 is booted up, the local start code is loaded from the bootstrap read-only memory, and the code stored in shared-use flash memory 42 is pre-assigned to hardware security module 40.

Hardware security module 40 assists with a process for eliminating program errors of hardware security module 40 via a security access 49 with the aid of an appropriate controller 48, which includes reading out all data stored in flash memory 42 and the internal data of hardware security module 40, except for internal AES keys. The debugging interface may be activated only internally by hardware security module 40, after a safeguarded authentication protocol based, for example, on an authentication request, including a challenge and response, between hardware security module 40 and an external debugger has been followed.

Each update gateway 28 in vehicle 21 is equipped with a hardware security module 40 on which an asymmetrical cryptographic identity for identifying and authenticating a certain update gateway 28 is stored. This cryptographic identity is created by the original equipment manufacturer during the vehicle manufacture, and identifies a certain update gateway 28 having a certain vehicle configuration. In this context, "vehicle configuration" is understood to mean a set of different control units which include a certain installed software version.

The cryptographic identity of update gateway 28 is made up of the following components: a secret key $K_{FG}^{-1}$ known only to hardware security module 40, a public key $K_{FG}$, associated with secret key $K_{FG}^{-1}$, for encrypting data or validating signatures, and a certificate Cert($K_{FG}$) of public key $K_{FG}$ which is issued by a trusted entity such as the vehicle manufacturer, together with further information concerning vehicle 21 for identifying the configuration of vehicle 21, such as the vehicle identification number, vehicle platform, or control unit configuration.

In addition to cryptographic identity ($K_{FG}^{-1}$, $K_{FG}$, Cert($K_{FG}$)), update gateway 28 stores public key $K_{backend}$ or the certificate of backend 37 which is linked via the air interface (over the air (OTA)). This cryptographic identity is referred to below as Cert ($K_{backend}$).

During manufacture of the vehicle, cryptographic identity ($K_{FG}^{-1}$, $K_{FG}$, Cert($K_{FG}$)) of update gateway 28 is applied or created by the vehicle manufacturer, and is securely certified by signature key $K_{OEM}^{-1}$ of the original equipment manufacturer in order to ensure a safeguarded, trusted vehicle configuration. It is not absolutely necessary to transmit Cert ($K_{FG}$) to OTA backend 37, provided that OTA backend 37 trusts signature key $K_{OEM}^{-1}$ of the original equipment manufacturer.

Figure 3:
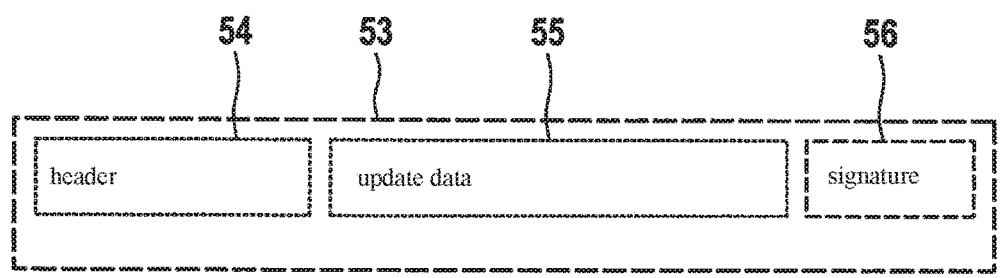
FIG. 3 shows update data protected by a signature.

Whenever a certain electronic control unit 57 is to be securely updated, update gateway 28 and OTA backend 37 create a mutually authenticated, safeguarded communication channel, which is based on $K_{FG}$ and $K_{backend}$, for example, with the aid of transport layer security. This communication channel ensures that both entities have been properly authenticated and a cryptographic session key has been specified in order to transmit update content. After a safeguarded communication channel has been created, update data 55 may be transferred as shown in FIG. 3. Update data 55 are made up of a header 54 in which pieces of information for electronic control unit 57, such as version number, identity of electronic control unit 57, cryptographic algorithm, and identity of the software supplier are stored, encrypted or authenticated new update data 55, and a cryptographic signature 56. Update data 55 are signed with a signature $K_{OEM}^{-1}$ which ensures the reliability of delivered update data 55. Signature $K_{OEM}^{-1}$ may be created by the original equipment manufacturer, the highest-priority supplier, or some other entity as a function of electronic control unit 57 and update data 55, as long as electronic control unit 57 acknowledges the signature as a valid signature. A cryptographic signature $K_{OEM}^{-1}$ of sufficient length and key size is recommended; thus, for example, the combination of a secure hash algorithm (SHA) of class SHA-2 in conjunction with a cryptosystem according to Rivest, Shamir, and Adleman (RSA) for a key size of at least 2048 bits may be considered. Alternatively, the digital signature algorithm (elliptic curve digital signature algorithm (ECDSA)) based on elliptical curve P-256 may be combined with SHA-2.

After update data 55 have been completely received by update gateway 28, update gateway 28 checks, by validating the signature and possible check sums by way of a consistency check, whether the data have been properly received. If the data have been properly received, the update operation of electronic control unit 57 may be initiated. Before electronic control unit 57 may be updated, update gateway 28 requests a ticket τ for executing the update operation. This ticket τ ensures that each update operation of an electronic control unit 57 is unambiguously permitted by OTA backend 37 and represents a reliable and credible update request. Without using this ticket τ, a possibly compromised update gateway 28 could activate security access 49 of the various control units and cause serious damage, since with security access 49 enabled, questionable commands to the control unit may be executed. This could result in serious denial of service (DoS), with high risks for the safety of the vehicle. It should be noted that ticket τ could alternatively be delivered in addition to update data 55, and does not have to be requested in a separate transmission session. Ticket τ is signed with a signature key $K_{ticket}^{-1}$ which is managed in backend 37 and utilized for authenticating valid tickets τ. Public key $K_{ticket}^{-1}$ is known to hardware security module 40, and may also be signed with $K_{backend}^{-1}$ 37 in order to embed it in the certificate hierarchy and simplify the verification operation. The validity of ticket τ is verified by hardware security module 40 as a trust anchor, which is presumed to be reliable since it is hardened against physical attacks. Ticket τ may be temporarily stored on update gateway 28, and does not have to be used immediately. Part of ticket τ is a random number, provided by hardware security module 40, which in a manner of speaking ensures the "freshness" of ticket τ.

Ticket τ includes a consecutive number "serialNo" of ticket τ, a public key $K_{FG}$ which denotes hardware security module 40 or update gateway 28, random number $N_1$ of hardware security module 40, pieces of information $ID_{ECU}$ concerning electronic control unit 57, pieces of information $SW_{version}$ concerning the software version to be updated, a reference to the software, for example in the form of a cryptographic fingerprint $SW_{reference}$, a counter or other pieces of information "run time" concerning the run time of ticket τ, and a cryptographic signature of ticket τ with $K_{ticket}^{-1}$.

This ticket τ is then transferred to hardware security module 40, which may activate security access 49 of the electronic control units. In the discussion below, it is assumed that for this purpose, hardware security module 40 stores all necessary information for activating security access 49, i.e., the necessary credentials for responding to the authentication requests from electronic control units 57. For example, a seed + key method, or more complex, advanced mechanisms based on asymmetrical or symmetrical cryptography in which a random number is directly authenticated, may be considered. The process for activating security access 49 of a certain electronic control unit 57 is standardized essentially according to ISO 14229. Nonetheless, other specific mechanisms for original equipment manufacturers or highest-priority suppliers may prove to be suitable. It should be noted that cryptographic credentials for activating security access 49 of vehicle 21, stored on hardware security module 40, are accorded a high level of protection, since hardware security module 40 stores the complete credentials and therefore must be protected from unauthorized extraction.

Figure 4:
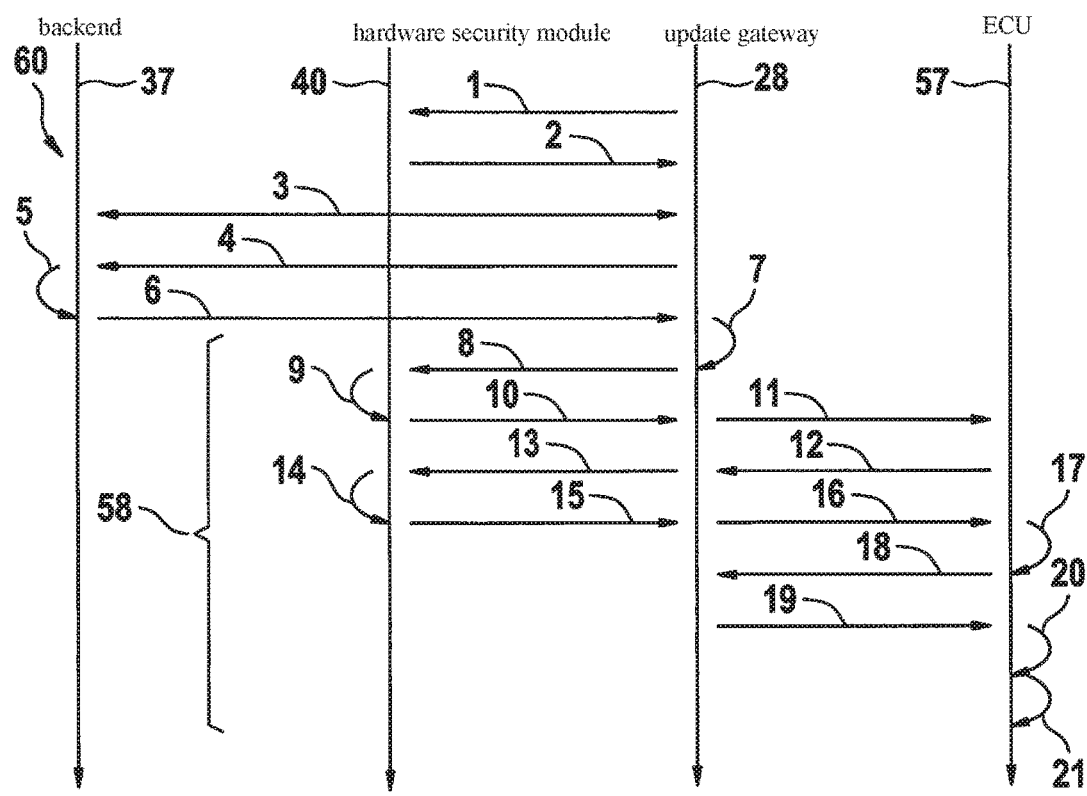
FIG. 4 shows the sequence diagram of an update method.

The complete process is shown in FIG. 4, and includes the following steps:

Update gateway 28 requests a certain update request "request" from hardware security module 40 and delivers an identifier $ID_{ECU}$ of electronic control unit 57 in step 1.

Hardware security module 40 generates a response in step 2 by signing the request with a certain update identity key $K_{HSM}^{-1}$ of hardware security module 40. The hardware security module generates the following message:

$$Request=(AlgParam, CommandParam, N1, ID_{ECU})_{K_{HSM}^{-1}}, Certic K_{HSM}$$

In the above equation, "AlgParam" denotes algorithmic parameters, "CommandParam" denotes pieces of information concerning the executed command, such as update request "request,$N_1$" is a cryptographic random number and is used as a random number for ensuring "freshness," and hardware security module 40 returns [update request] "request" to update gateway 28.

Update gateway 28, based on $K_{FG}^{-1}$, Cert($K_{FG}$), and Cert($K_{backend}$), creates a safeguarded, mutually authenticated communication channel to backend 37, for example with the aid of TLS, in step 3.

Update gateway 28 delivers update request "request" to backend 37 in step 4.

In step 5, backend 37 validates update request "request" based on Cert($K_{HSM}$), and confirms whether hardware security module 40 is a genuine hardware security module 40 which protects the necessary credentials for security access 49. When the validation succeeds, backend 37 generates a ticket τ of the following form:

$$\tau=(serialNo, N_1, ID_{FG}, ID_{ECU}, SW_{version}, SW_{reference}, run\ time)_{K_{ticket}^{-1}}$$

Backend 37 delivers τ in addition to update data 55 to update gateway 28, with the aid of the safeguarded communication channel, in step 6. In addition, certificate Cert ($K_{ticket}$) Of ticket τ may be transferred if it is not already stored in hardware security module 40 or update gateway 28. The update data are continuously stored on the update gateway or some other external memory, and may be successively checked in step 7. Step 6 runs until all data have been received and correctly transferred.

In step 7 (for this and the following steps, no network is required 58), update gateway 28 confirms via cyclic redundancy checks (CRCs) whether the data have been properly received, and carries out checks of the consistency and proper formatting of update data 55.

The signature of update data 55 for the signature validation is delivered to hardware security module 40 in step 8.

In step 9, hardware security module 40 validates the signature of update data 55 with the aid of public information Cert($K_{ticket}$) of backend 37 and of fingerprint $SW_{reference}$, likewise delivered to hardware security module 40. It is noted that the public key for validating the signature of update data 55 may alternatively be stored on update gateway 28. In this case, the key is either delivered to hardware security module 40, or the signature validation is carried out directly on update gateway 28, and steps 8 through 10 are carried out by update gateway 28.

Update gateway 28 reports the result of the signature validation in step 10.

Before update gateway 28 initiates the update operation with steps 11 through 21, update gateway 28 must ensure that vehicle 21 is in a completely safe environment, i.e., for example vehicle 21 is at a standstill and the engine is switched off. This may be carried out, for example, by taking note of the vehicle bus and ascertaining heuristics for a completely secure time period. The exact mechanisms are not the subject matter of the present invention.

After update gateway 28 has established that vehicle 21 is in a safeguarded environment, and has been externally prompted in any way, for example by an additional message from backend 37 or participation by the user, to execute the update operation, update gateway 28 requests electronic control unit 57 to activate security access 49. The activation of security access 49 is standardized according to ISO 14229, and typically includes sending the command 0x27 to electronic control unit 57. Further mechanisms for activating a security access 49 may exist in addition to security access 49, described in greater detail in ISO 14229.

Electronic control unit 57 responds in step 12 by sending a starting value or an authentication request $N_1$, which is transferred to hardware security module 40 for the correct response.

The starting value or authentication request $N_1$ in addition to ticket τ and information $ID_{ECU}$ concerning requested electronic control unit 57 are transferred to hardware security module 40 in step 13.

Hardware security module 40 confirms in step 14 whether ticket τ is valid; i.e., the following tests must be passed: the signature of ticket τ is valid; the signature of $N_1$ ensures the "freshness" of ticket τ; $ID_{ECU}$ matches $ID_{ECU}$ stored in ticket τ; a check of $ID_{FG}$ shows that ticket τ has not been replayed via another update gateway 28; and a check of the internal database of all random numbers already used once (nonces) shows that $N_1$ has not yet been used. It should be noted that the numbers which are used once may be replaced by a strictly monotonic counter. In this case, hardware security module 40 manages a list of counters for each control unit, and increments the counter for each new ticket request. This has the effect that older counter values are invalidated.

If the above tests are successful, ticket τ is invalidated by storing $N_1$ in an internal database of hardware security module 40 in which all invalidated tickets are stored. It is pointed out that this database may also be managed outside hardware security module 40 if replay attacks may reliably be prevented by using synchronously running counters in the memory. After ticket τ has been invalidated, hardware security module 40 responds with the correct starting value or the correct response with the aid of the cryptographic credential stored within hardware security module 40.

The response is delivered to update gateway 28 in step 15.

The response is delivered to electronic control unit 57 in step 16.

The response is validated in step 17, and electronic control unit 57 activates security access 49.

A response, typically 0x67, is delivered to update gateway 28 in step 18.

The control unit contents may be loaded on electronic control unit 57 in step 19.

The detailed update operation in step 20 may be different, and may extend from the transfer of all data and immediate writing of same onto flash memory 42 and validation of the signature of the received new content (internal to the control unit) after the content has been completely received and installed, for example, by the boot manager (bootstrap loader, bootloader), to block-by-block validation of each piece of data received.

Before the new content is executed, a software component, for example the boot manager, validates the signature of the downloaded software in step 21. If the check of the signature is successful, the boot manager runs the new software.

Figure 5:
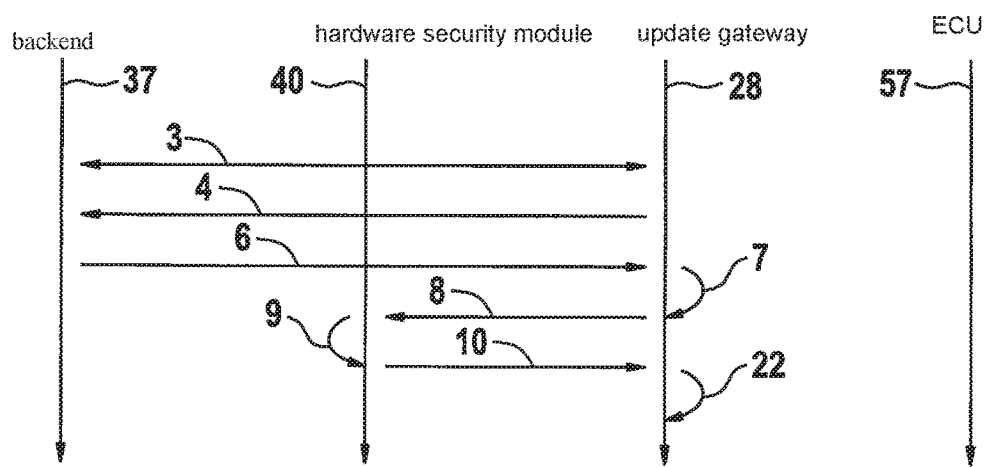
FIG. 5 shows the sequence diagram of a submethod for downloading update data.

Alternatively, it is possible for update gateway 28 to regularly check for updates 32. In this regard, the downloading of update data 55 and temporary storage of update data 55 on update gateway 28 or some other external memory in a safeguarded, reliable manner is independent of the subsequent update operation. The resulting operation is shown in FIG. 5.

Except for step 22, this specific embodiment is similar to that in FIG. 4. Update data 55 are securely stored on update gateway 28 within step 22. There are various measures to ensure this, for example by utilizing a message authentication code (MAC) which uses a key that is stored within hardware security module 40, and confirming the integrity at regular intervals or whenever container file 53 is accessed. However, this may also take place, for example, by storing the signature in addition to update data 55, and validating the data and carrying out consistency checks once again before electronic control unit 57 is updated. It is pointed out that the signature of container file 53 on electronic control unit 57 must be rechecked prior to installation.

Two different architectures of update gateway 28 may be used to carry out a secure OTA update, which is the subject matter of specific embodiments of the present invention. A first specific embodiment uses an internal hardware security module 40, and the second specific embodiment uses an external hardware security module 40. Additional security mechanisms on processor core 41 of the host computer, for example safeguarded start (bootstrap, boot), may likewise be used. Another, third specific embodiment does not use a hardware security module 40, and generated ticket τ is not stored on update gateway 28. However, this specific embodiment cannot ensure the security of the overall secure OTA update operation, since ticket τ may be easily replayed via update gateway 28.

Figure 6:
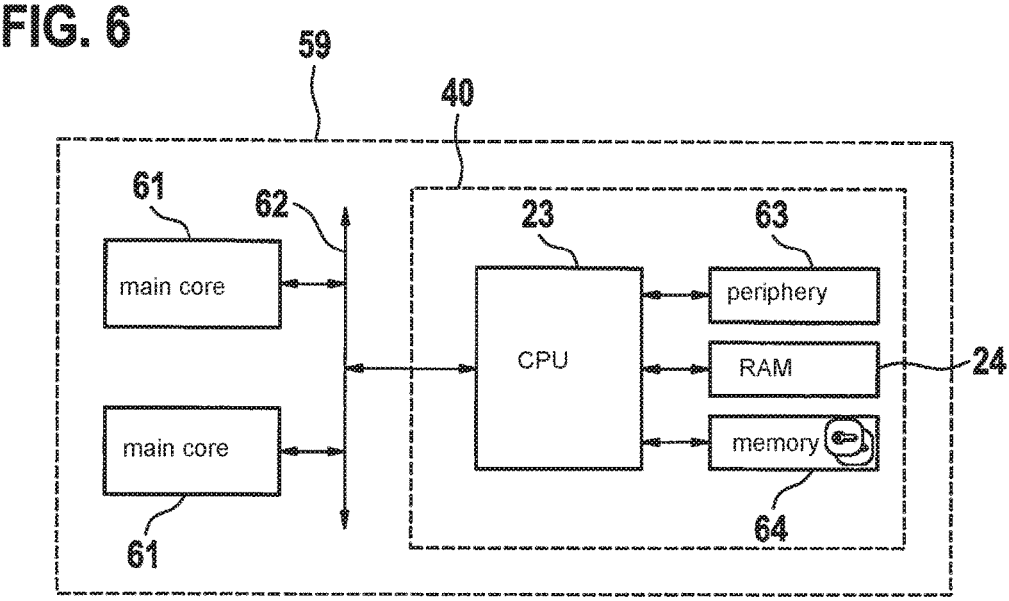
FIG. 6 shows the block diagram of an update gateway based on an internal hardware security module.

FIG. 6 shows the first possible specific embodiment, whose architecture is based on an internal hardware security module 40 of update gateway 28. A suitable environment is characterized by a one-chip system 59 (system on a chip, SOC) which includes multiple CPU cores utilized as main cores 61 and at least one CPU core 23, connected via a system bus 62, for the main functionality of the embedded software system. Hardware security module 40 is implemented as a subsystem on the same chip with the following key elements: communication with main cores 61 on the SoC bus, hardware shielding of the HSM functionality—examples include a CPU, nonvolatile memory 64, random access memory 24, and periphery 63—a CPU core 23 for the HSM functionality, separate from functionality on main cores 61, which allows a use of software functionality in a secure environment, and cryptographic credentials stored within a nonvolatile memory or read-only memory. The primary software functionality of update gateway 28 is executed on main cores 61.

Figure 7:
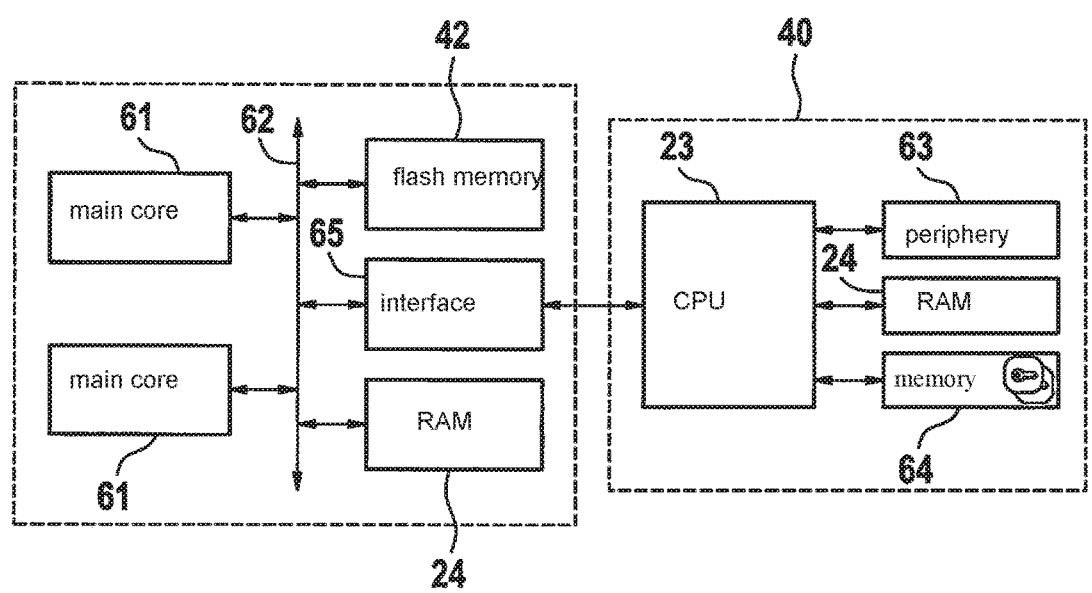
FIG. 7 shows the block diagram of an update gateway based on an external hardware security module.

FIG. 7 shows the second possible specific embodiment, whose architecture is based on an external hardware security module 40 of update gateway 28; examples include smart cards, and security controllers such as a chip card (universal integrated circuit card (UICC)) or trusted platform module (TPM). A suitable environment is characterized by a one-chip system which includes multiple CPU cores utilized as main cores 61, and at least one CPU core 23 for the main functionality of the embedded software system. Hardware security module 40 is implemented as an external component with the following key elements: communication with main core 61 via a peripheral device interface 65, such as a serial peripheral interface (SPI) 65, inter-integrated circuit ($I^2C$), or low pin count (LPC) interface, hardware shielding of the HSM functionality—examples include CPU, nonvolatile memory 64, random access memory 24, and periphery 63—a CPU core 23 for the HSM functionality, separate from functionality on main cores 61, which allows a use of software functionality in a secured environment, and cryptographic credentials stored within a nonvolatile memory or read-only memory. The primary software functionality of update gateway 28 is executed on main cores 61. Security-critical software such as the validation of ticket τ or security libraries is run on external hardware security module 40.

The second specific embodiment may use essentially standard smart card devices against physical attacks on hardware security module 40, which are accorded a very high level of protection, in particular in comparison to the first specific embodiment. However, the communication channel between hardware security module 40 and the one-chip system may be problematic, since an attacker may easily intervene in this channel. To reduce the attacks on this communication channel, an additional cryptographic channel should be used in such a way that the data communication takes place only in an encrypted manner. The implementation of this channel is not important, and is not the subject matter of the present invention. If the communication channel is tunneled to electronic control unit 57, it has been found that applying a dedicated encryption channel between update gateway 28 and the control unit is not necessary.

The message in step 19 of FIG. 4 may likewise be expanded to allow encrypted data communication to the control unit based on the safeguarded data transmission protocol described in greater detail in ISO 14229. For this purpose, a secured communication channel is created, based on the exchanged authentication requests in addition to the random number and the shared-use cryptographic material (see steps 12 through 16 in this regard). Multiple specific embodiments are possible. It is noted that the following protocol implicitly also carries out a security access, and steps 12 through 16 do not additionally have to be carried out.

In one simple specific embodiment, an asymmetrical cryptosystem could be used in which public keys $K_{enable}$ and $K_{HSM}$ are applied in the control unit, and hardware security module 40 stores the resulting key pairs ($K_{enable}$, $K_{enable}^{-1}$), which in each case are made up of a private key and a public key. The control unit generates an authentication request, for example based on a true random number generator or some other source of randomness, generates a session key "session$_{key}$" by computing session$_{key}$=KDF(parent key, nonce$_2$), where KDF refers to a key derivation function and "parent key" refers to a starting value for generating a session key "session$_{key}$," and sends the following message to hardware security module 40 of update gateway 28:

ECU→HSM: {nonce$_1$, session$_{key}$}$_{K_{enable}}$

Hardware security module 40 extracts session$_{key}$ and responds with the following message by encrypting the message with AES:

HSM→ECU:
{nonce$_1$, nonce$_3$}$_{session_{key}}$, MAC({nonce$_1$, nonce$_3$}$_{session_{key}}$), session$_{key}$ To further ensure the authenticity of the message, AES could be utilized in Galois/counter mode (GCM), which involves delivery of an additional GCM authenticity identifier in addition to the message.

If the control unit successfully extracts this message, a safeguarded cryptographic channel has been created for exchanging data. In one of the subsequent messages, the control unit also delivers "nonce$_3$" in order to provide a link for hardware security module 40. Further messages may also be protected for integrity by adding cipher-based message authentication code (CMAC) specified in NIST Special Publication 800-38B, or by directly applying AES-GCM.

Generated session key "session$_{key}$" is then used by update gateway 28 for encrypting data for electronic control unit 57. For this purpose, hardware security module 40 must provide an interface to update gateway 28 so that it may encrypt data with the generated session key "session$_{key}$." It is noted that session key "session$_{key}$" does not have to be delivered to update gateway 28.

FG→ECU: {update data}$_{session_{key}}$

More highly developed specific embodiments based on symmetrical or asymmetrical keys, in which the control unit and hardware security module 40 have their own cryptographic key, are likewise possible. A detailed definition of these mechanisms is not the subject matter of the present invention.

While no direct connection of delivered update data 55 and of provided ticket τ is provided in FIG. 3, one conceivable enhancement is to tunnel update gateway 28 by transferring the update content to electronic control unit 57 by way of hardware security module 40. This may increase the security, since in this case it is not possible to unlock the control unit with a valid ticket τ and deliver other update data 55 as initially requested.

In this specific embodiment, all data are delivered by way of hardware security module 40. For this purpose, hardware security module 40 and electronic control unit 57 create a cryptographic channel in order to tunnel a possibly unreliable or even compromised update gateway 28. Hardware security module 40 temporarily stores update data 55 before they are transferred to electronic control unit 57, and confirms whether the transferred signature in addition to update data 55 matches the cryptographic fingerprint of ticket τ. If only small amounts of data, for example a few kilobytes, are delivered to electronic control unit 57, for example by way of a differential update 32 (delta update), this may be handled directly by temporarily storing all data and comparing same to the cryptographic fingerprint or CMAC of ticket τ, which is formed according to SHA-2 or SHA-3, for example. If a comparable amount of data is transferred, ticket τ could be expanded to carry multiple fingerprints, so that the verification of the fingerprints may be subdivided in piecemeal fashion. It is noted that the data may still be downloaded to update gateway 28 and stored there. The data do not pass through hardware security module 40 until they are transferred to electronic control unit 57.

As an alternative to using a hardware security module 40 within update gateway 28, where the credentials for carrying out the security access are stored on electronic control unit 57, it would be possible to store the credentials for carrying out the security access in backend 37. Although the credentials in this case are better protected, the direct incorporation of backend 37 into the update operation, or at least into the initialization of the update operation, may be regarded as disadvantageous, depending on the application. For this reason, a network connection must be established in order to carry out the update of electronic control unit 57. In this scenario, the message generated in step 12 in FIG. 4 is conveyed to backend 37 via the created safeguarded communication channel, and the response is transferred back to electronic control unit 57.

What is claimed is:
1. A method for updating an embedded electronic control unit, comprising:
   requesting, by an update gateway from a hardware security module, an update request destined for the electronic control unit;

receiving, by the update gateway from the hardware security module, the update request, which is signed by the hardware security module;

creating, by the update gateway, a communication channel, based on a cryptographic identity of the update gateway, to a backend;

sending, by the update gateway, the update request to the backend;

receiving, by the update gateway from the backend via the communication channel, an update ticket which corresponds to the update request and is signed by the backend, in addition to associated update data;

validating, by the update gateway, the update data;

initiating, by the update gateway, a validation of the update ticket;

checking, by the update gateway, a result of the validation;

depending on the result, updating, by the update gateway, the electronic control unit with the update data;

wherein the cryptographic identity includes a secret key which is known only to the hardware security module, a public key associated with the secret key, and a certificate of the public key which is issued by a trusted entity, and which is a function of a system environment of the update gateway;

wherein the update data are received in a container file, together with a cryptographic signature, and the validation of the update data includes a check of the signature with the aid of a certificate of the backend;

wherein the update gateway stores a public key of the update ticket which is signed by the backend, and the validation of the update ticket is carried out by the update gateway with the aid of the public key; and wherein the initiating of the validation includes an at least partial transfer of the update ticket to the hardware security module, and the update gateway receives the result of the validation from the hardware security module.

2. The method as recited in claim 1, wherein the update gateway is tunneled with a cryptographic communication channel.

3. A method for updating an embedded electronic control unit, comprising:

requesting, by an update gateway from a hardware security module, an update request destined for the electronic control unit;

receiving, by the update gateway from the hardware security module, the update request, which is signed by the hardware security module;

creating, by the update gateway, a communication channel, based on a cryptographic identity of the update gateway, to a backend;

sending, by the update gateway, the update request to the backend;

receiving, by the update gateway from the backend via the communication channel, an update ticket which corresponds to the update request and is signed by the backend, in addition to associated update data;

validating, by the update gateway, the update data;

initiating, by the update gateway, a validation of the update ticket;

checking, by the update gateway, a result of the validation;

depending on the result, updating, by the update gateway, the electronic control unit with the update data;

requesting, by the update gateway from the electronic control unit, a security access authorization to the electronic control unit;

receiving, by the update gateway, an authentication request from the electronic control unit;

sending, by the update gateway, the authentication request, in addition to the update ticket and an identifier of the electronic control unit, to the hardware security module;

receiving, by the update gateway from the hardware security module, a response to the authentication request, based on a validation of the update ticket;

sending, by the update gateway, the response to the electronic control unit;

receiving, by the update gateway, the security access authorization from the electronic control unit; and transferring, by the update gateway, the update data to the electronic control unit so that that the electronic control unit may install and validate software, based on the update data.

4. The method as recited in claim 3, further comprising:

storing, by the update gateway, the update data in a protected manner;

wherein the creating of the communication channel, the sending of the update request, the receiving of the update data, the initiating of the validation, and the checking of the result take place before the update data are stored.

5. A non-transitory machine-readable memory medium storing a computer program for updating an embedded electronic control unit, the computer program, when executed by processor, causing the processor to perform:

requesting from a hardware security module an update request destined for the electronic control unit;

receiving from the hardware security module the update request, which is signed by the hardware security module;

creating a communication channel, based on a cryptographic identity of the update gateway, to a backend;

sending the update request to the backend;

receiving from the backend via the communication channel, an update ticket which corresponds to the update request and is signed by the backend, in addition to associated update data;

validating the update data;

initiating a validation of the update ticket;

checking a result of the validation; and depending on the result, updating the electronic control unit with the update data;

requesting, by the update gateway from the electronic control unit, a security access authorization to the electronic control unit;

receiving, by the update gateway, an authentication request from the electronic control unit;

sending, by the update gateway, the authentication request, in addition to the update ticket and an identifier of the electronic control unit, to the hardware security module;

receiving, by the update gateway from the hardware security module, a response to the authentication request, based on a validation of the update ticket;

sending, by the update gateway, the response to the electronic control unit;

receiving, by the update gateway, the security access authorization from the electronic control unit; and transferring, by the update gateway, the update data to the electronic control unit so that that the electronic control unit may install and validate software, based on the update data.

6. An update gateway embodied at least partially in hardware for updating an embedded electronic control unit, the update gateway configured to:
  request from a hardware security module an update request destined for the electronic control unit;
  receive from the hardware security module the update request, which is signed by the hardware security module;
  create a communication channel, based on a cryptographic identity of the update gateway, to a backend;
  send the update request to the backend;
  receive from the backend via the communication channel an update ticket which corresponds to the update request and is signed by the backend, in addition to associated update data;
  validate the update data;
  initiate a validation of the update ticket;
  check a result of the validation; and
  update the electronic control unit with the update data depending on the result;
  request from the electronic control unit, a security access authorization to the electronic control unit;
  receiving an authentication request from the electronic control unit;
  send the authentication request, in addition to the update ticket and an identifier of the electronic control unit, to the hardware security module;
  receive from the hardware security module, a response to the authentication request, based on a validation of the update ticket;
  send the response to the electronic control unit;
  receive the security access authorization from the electronic control unit; and
  transfer the update data to the electronic control unit so that that the electronic control unit may install and validate software, based on the update data.

\* \* \* \* \*